United States Patent
Yang et al.

(10) Patent No.: US 7,834,969 B2
(45) Date of Patent: Nov. 16, 2010

(54) MULTI-DOMAIN VERTICAL ALIGNMENT LIQUID CRYSTAL DISPLAY PANEL

(75) Inventors: Chia-Jung Yang, Hsin-Chu (TW);
Jenn-Jia Su, Hsin-Chu (TW);
Chieh-Ting Chen, Hsin-Chu (TW);
Ting-Jui Chang, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 861 days.

(21) Appl. No.: 11/560,852

(22) Filed: Nov. 17, 2006

(65) Prior Publication Data

US 2008/0024706 A1   Jan. 31, 2008

(30) Foreign Application Priority Data

Jul. 31, 2006   (TW) ............................... 95127983 A

(51) Int. Cl.
*G02F 1/1337* (2006.01)
(52) U.S. Cl. ..................................................... 349/129
(58) Field of Classification Search .................. 349/84, 349/129, 139, 143, 146
See application file for complete search history.

(56) References Cited

U.S. PATENT DOCUMENTS

| 6,661,488 | B1 | 12/2003 | Takeda |
| 7,023,516 | B2 | 4/2006 | Yoshida |
| 7,486,366 | B2 * | 2/2009 | Kataoka et al. ............. 349/143 |
| 7,554,638 | B2 * | 6/2009 | Lin ............................. 349/129 |
| 2002/0105610 | A1 * | 8/2002 | Takeda et al. ............... 349/129 |
| 2006/0098151 | A1 | 5/2006 | Inoue et al. |
| 2006/0146243 | A1 | 7/2006 | Nakanishi et al. |
| 2006/0146259 | A1 | 7/2006 | Kim |

FOREIGN PATENT DOCUMENTS

| CN | 1779536 A | 5/2006 |
| EP | 1 659 444 A2 | 5/2006 |
| EP | 1659444 A2 | 5/2006 |
| TW | I255380 | 5/2006 |

* cited by examiner

*Primary Examiner*—Sarah Hahm
(74) *Attorney, Agent, or Firm*—Winston Hsu; Scott Margo

(57) ABSTRACT

A multi-domain vertical alignment (MVA) liquid crystal display panel includes an array substrate, a color filter (CF) substrate arranged in parallel to the array substrate, a plurality of bump patterns disposed on the CF substrate, and a plurality of transparent electrode patterns disposed on the array substrate. Each bump pattern includes a main bump corresponding to a pixel region, and at least one bump wing corresponding to a scan line or a data line. Each main bump includes a first protrusion connected to a side of the main bump. Each transparent electrode pattern includes a main slit. The transparent electrode pattern further includes a plurality of fine slits disposed in an inner side and in an outer side of the main slit. The fine slits disposed in the outer side of the main slit near the data line have different lengths.

12 Claims, 8 Drawing Sheets

MULTI-DOMAIN VERTICAL ALIGNMENT LIQUID CRYSTAL DISPLAY PANEL

BACKGROUND OF THE INVENTION

1. Field of the Invention

The present invention relates to a multi-domain vertical alignment liquid crystal display panel, and more specifically, a multi-domain vertical alignment liquid crystal display panel using a bump pattern to improve arrangement ability of liquid crystal molecules and using a transparent electrode pattern to improve a distribution of electric field.

2. Description of the Prior Art

With revealingly large sizes of liquid crystal display panels, the liquid crystal display panels must have a characteristic of a wide viewing angle so as to be able to satisfy a requirement in use. Therefore, the multi-domain vertical alignment liquid crystal display panel having a characteristic of a wide viewing angle has become a mainstream product of the present large sized liquid crystal display panels.

Please refer to FIG. 1, which is a schematic diagram of a multi-domain vertical alignment display panel according to the prior art. As shown in FIG. 1, the multi-domain vertical alignment display panel 10 comprises a first substrate 12, a second substrate 14 and liquid crystal molecules 16 filled between the first substrate 12 and the second substrate 14. The first substrate 12 comprises a plurality of thin-film transistors (not shown in figure), a plurality of pixel electrodes 18 disposed on the first substrate 12, a plurality of first bumps 20 disposed on the pixel electrodes 18 and a first alignment film 22 covering the first bumps 20 and the pixel electrodes 18. The second substrate 14 comprises a common electrode 24, a plurality of second bumps 26 and a second alignment film 28 covering the second bumps 26 and the common electrode 24.

As shown in FIG. 1, because of the disposition of the first bumps 20 and second bumps 26, the liquid crystal molecules 16 will tilt along different directions in the pixel region of the multi-domain vertical alignment liquid crystal display panel 10. A pixel region can form several display regions so as to have the characteristic of a wide viewing angle.

Please refer to FIG. 2, which illustrates image retention of the multi-domain vertical alignment display panel according to the prior art. As shown in FIG. 2, when the multi-domain vertical alignment display panel according to the prior art is displaying black frame D1, grey frame D2, black and white mosaic frame D3 and white frame D4 in order, the white frame D4 will not display normally and has image retention.

SUMMARY OF THE INVENTION

It is therefore a primary object to provide a multi-domain vertical alignment liquid crystal display panel for improving the arrangement ability of liquid crystal molecules by bump pattern and improving the distribution of the electric field by the transparent electrode pattern.

According to an embodiment of the present invention, a multi-domain vertical alignment liquid crystal display panel is provided. The multi-domain vertical alignment liquid crystal display panel includes an array substrate, a color filter substrate arranged parallel to the array substrate and a plurality of transparent electrode patterns disposed on the array substrate opposite to the color filter substrate. The array substrate has a plurality of scan lines and a plurality of data lines, and the scan lines and the data lines of the array substrate define a plurality of pixel regions. Each transparent electrode pattern corresponds to one pixel region, and each transparent electrode pattern includes a main slit. The main slit has two endpoints. The transparent electrode pattern further includes a plurality of fine slits located in the outer side and the inner side of the main slit and the fine slits disposed in the outer side of the main slit near the data line have different lengths.

According to another embodiment of the present invention, a multi-domain vertical alignment liquid crystal display panel is provided. The multi-domain vertical alignment liquid crystal display panel includes an array substrate, a color filter substrate arranged parallel to the array substrate and a plurality of bump patterns disposed on a side of the color filter substrate opposite to the array substrate. The array substrate has a plurality of scan lines and a plurality of data lines, and the scan lines and the data lines of the array substrate define a plurality of pixel regions. Each bump pattern includes a main bump corresponding to one pixel region and at least one bump wing corresponding to the data line or scan line. The bump wing is connected to at least one endpoint of the main bump, and each bump pattern further has a first protrusion connected to the main bump.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
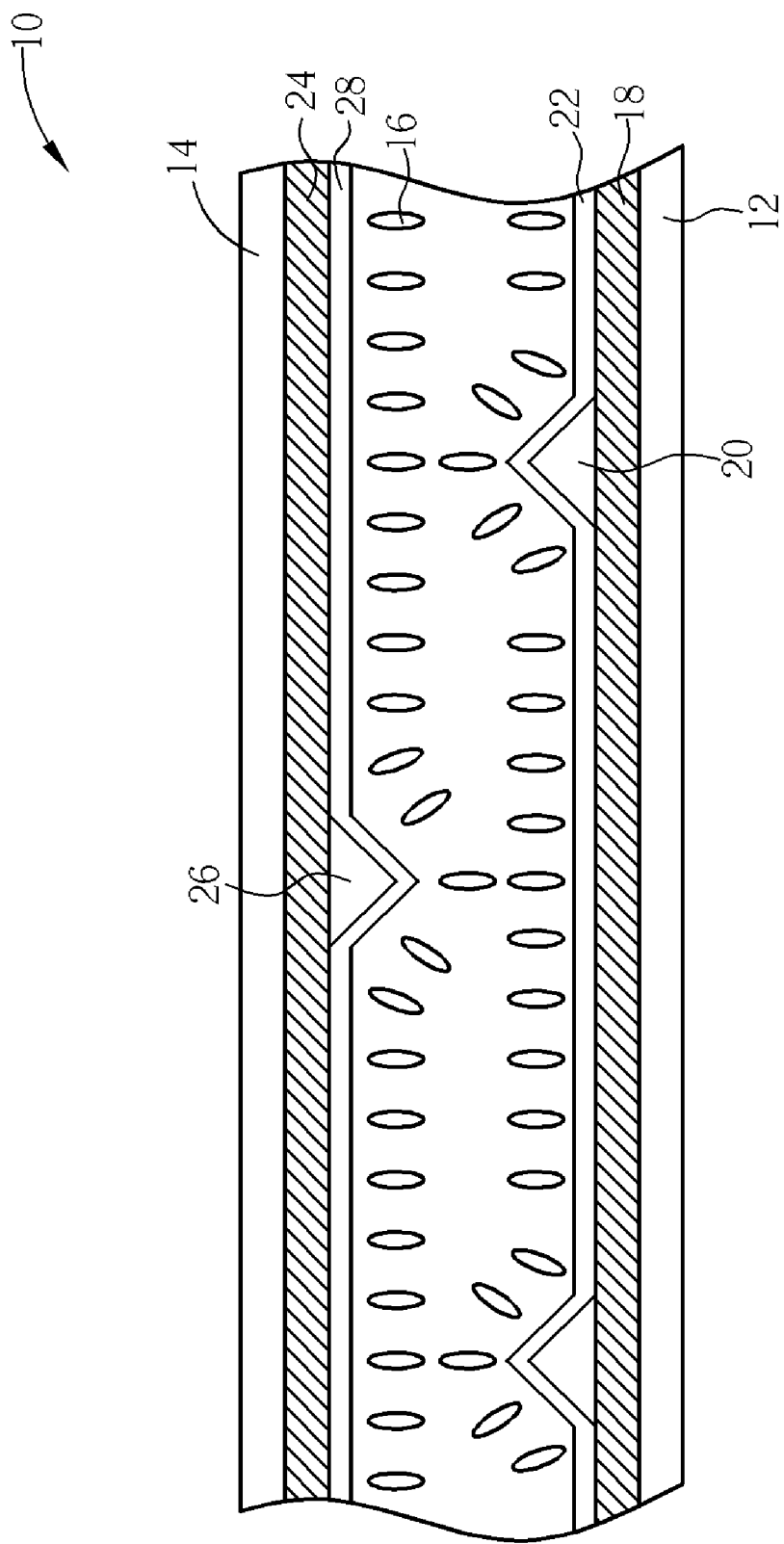
FIG. 1 is a schematic diagram of a multi-domain vertical alignment display panel according to the prior art.
Figure 2:
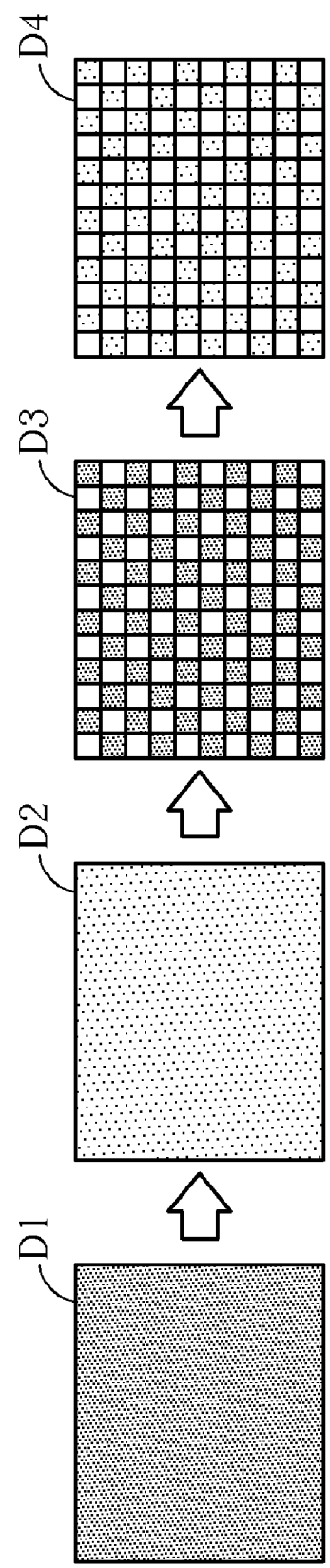
FIG. 2 illustrates the image retention of the multi-domain vertical alignment display panel according to the prior art.

Although the prior art multi-domain vertical alignment liquid crystal display panel has a wide viewing angle, the arrangement of the liquid crystal near the bump structure may be degraded by the bump structure so as to easily have image retention while displaying images. Please refer to FIG. 2, the white frame D4 may not display normally and has image retention because of bad arrangement of liquid crystal molecules.

Figure 3:
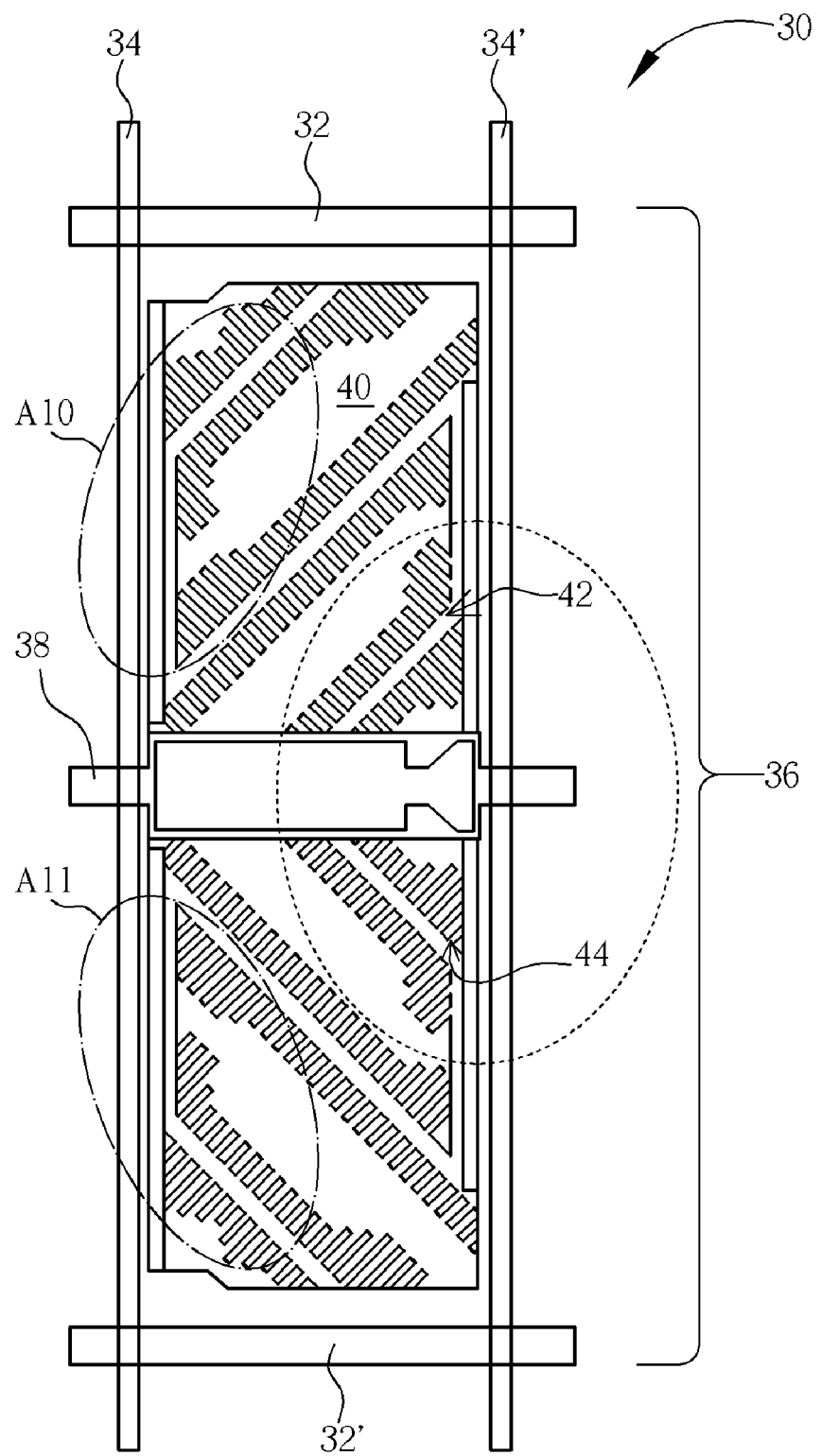
FIG. 3 through FIG. 6 are layout diagrams of the multi-domain vertical alignment liquid crystal display panel according to a preferred embodiment of the present invention.
Figure 4:
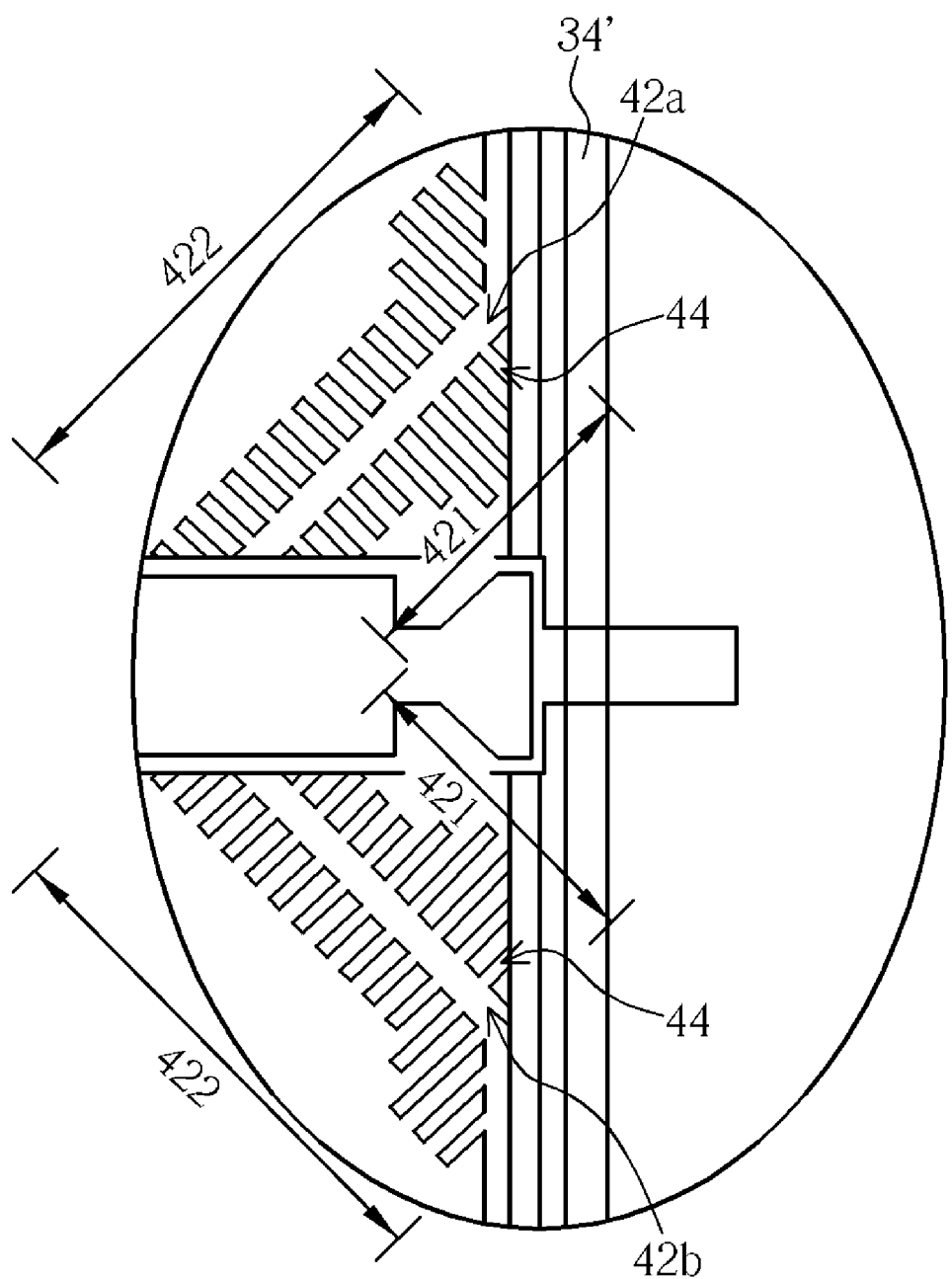
Figure 5:
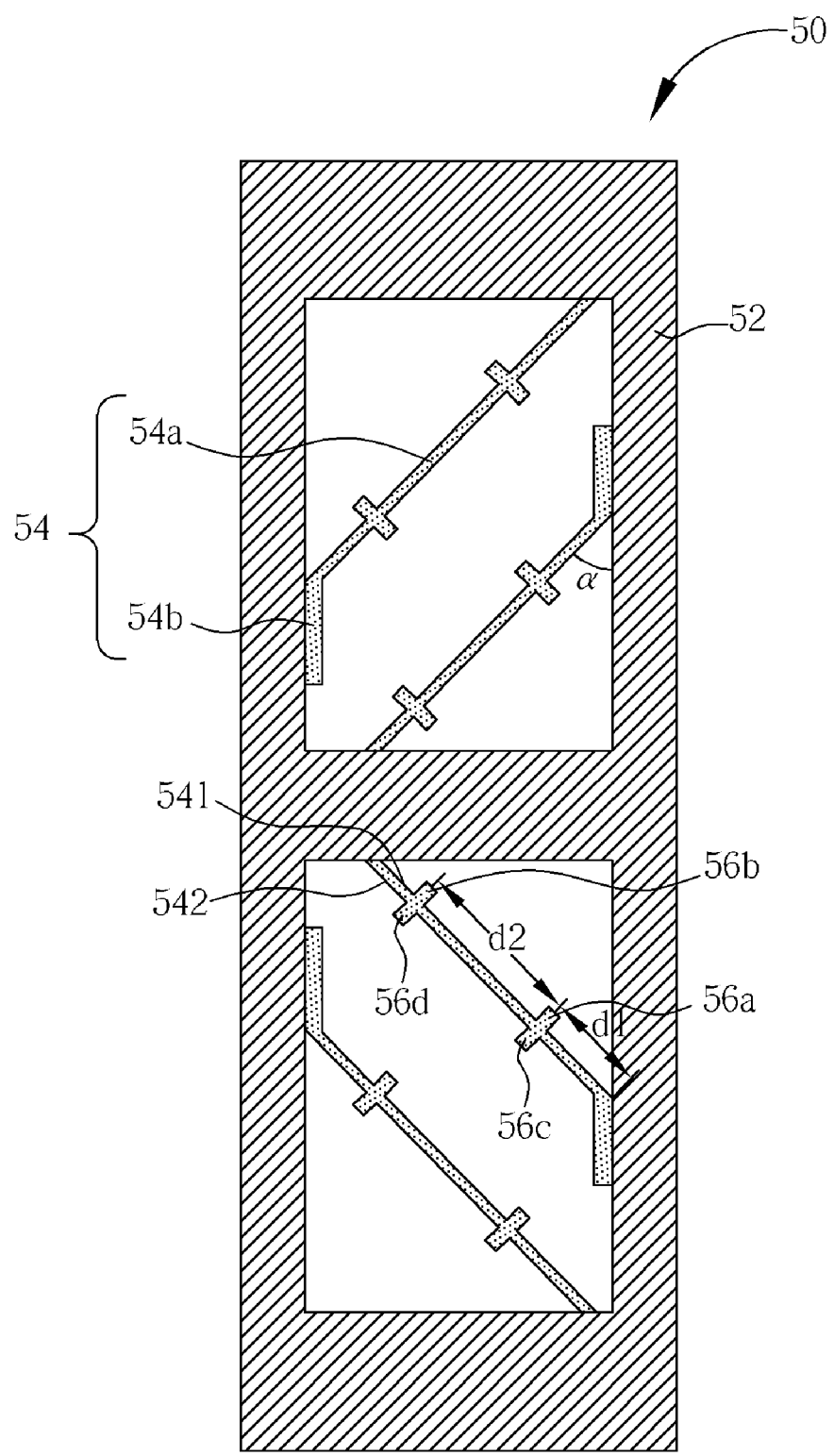
Figure 6:
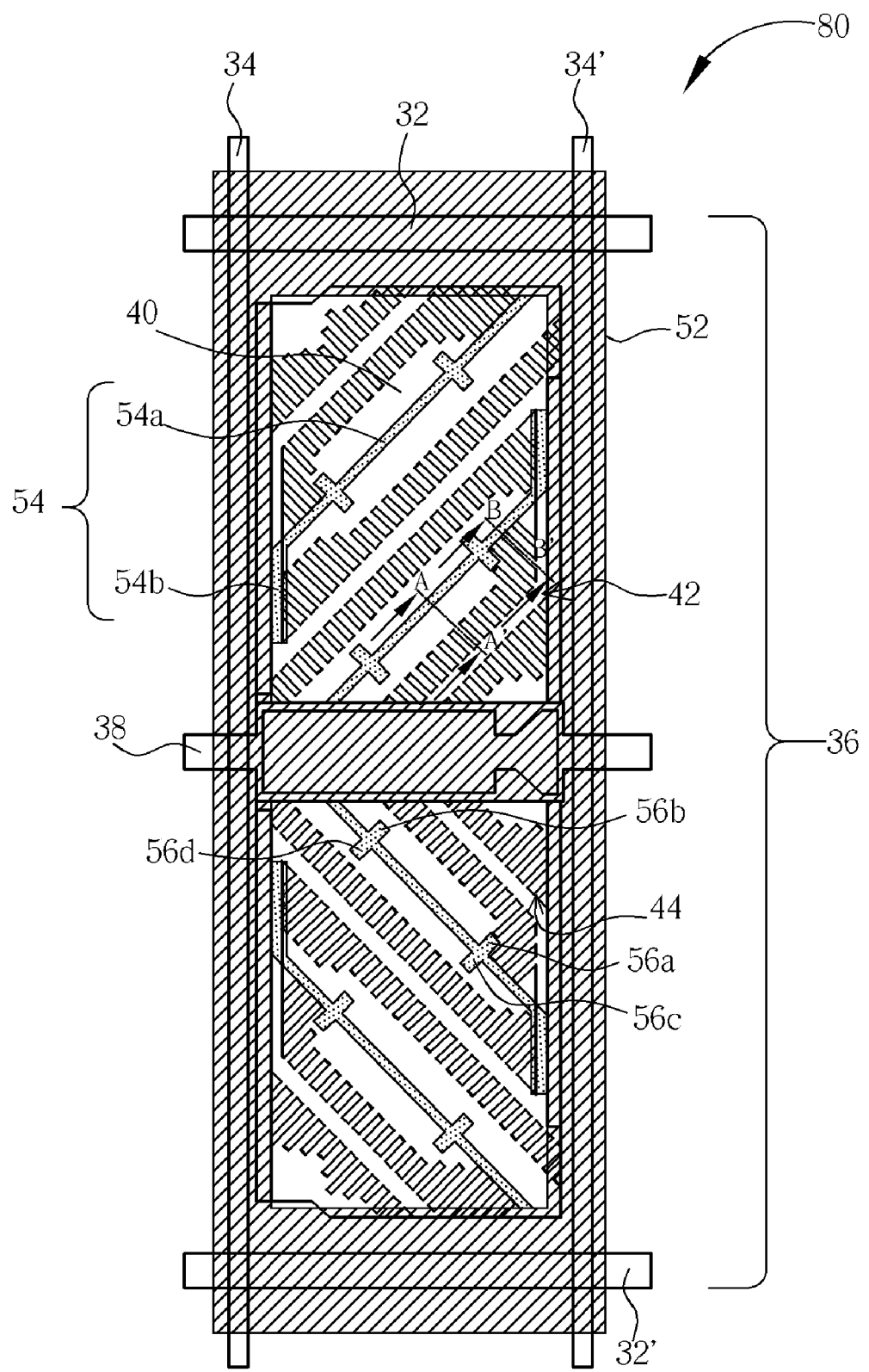

Please refer to FIG. 3 through FIG. 6, which are layout diagrams of the multi-domain vertical alignment liquid crystal display panel according to a preferred embodiment of the present invention, where FIG. 3 is a layout diagram of the array substrate, FIG. 4 is an enlarged view of the V-shaped slit, FIG. 5 is a layout diagram of the color filter substrate, and FIG. 6 is a layout diagram of the overlap of the color filter substrate and the array substrate. For showing the characteristics of the present invention, only one pixel region is drawn in FIG. 3 through FIG. 6. As shown in FIG. 3 through FIG. 6, the multi-domain vertical alignment liquid crystal display panel 80 of the embodiment comprises an array substrate 30, a color filter substrate 50 arranged parallel to the array substrate 30 and a liquid crystal layer (not shown in figure) disposed between the array substrate 30 and the color filter substrate 50.

As shown in FIG. 3, the array substrate 30 comprises a plurality of scan lines 32, 32' and a plurality of data lines 34, 34'. The scan lines 32, 32' and the data lines 34, 34' of the array substrate 30 define a plurality of pixel regions 36. Each pixel region 36 further comprises a plurality of storage capacitor bus lines 38 disposed parallel to the scan lines 32, 32' and penetrating through the pixel regions 36.

The array substrate 30 further comprises a plurality of transparent electrode patterns 40 disposed on the array substrate 30 opposite to the color filter substrate 50 and corresponding to each pixel region 36. Each transparent electrode pattern 40 comprises a plurality of slits obliquely intersecting with the scan lines 32, 32' and the data lines 34, 34', where the slits comprise main slits. Main slit may be V-shaped, W-shaped or U-shaped, for example. The storage capacitor bus line 38 is located at the center of the V-shaped slits 42, where the V-shaped slits 42 have a whole V shape. As shown in FIG. 4, the V-shaped slit 42 has two non-intersecting endpoints 42a, 42b, and the two non-intersecting endpoints of the V-shaped slit 42 are pointing to the data lines 34'. A plurality of fine slits 44 disposed at the inner side 421 and at the outer side of the V-shaped slit 42, wherein the fine slits 44 disposed at the outer side 422 of the V-shaped slit 42 near the data line 34' have different lengths. More exactly, the fine slits 44 in this area have the lengths progressively increased at first and then progressively decreased. In other words, the fine slits 44 closer to the data line 34' have various lengths. In this embodiment, the fine slits 44 at the inner side 421 of the V-shaped slit 42 have a design of different lengths, but the design is not limited to this embodiment and can have the same length. In addition, the other slits of the transparent electrode pattern 40 also can include the design having the fine slits depending on requirements. Otherwise, as shown in FIG. 3, at left side of the dotted line area A10 and A11, the fine slits 44 have the lengths progressively increased at first and then progressively decreased. In other words, the fine slits 44 closer to the data line 34 have various lengths. The fine slits 44 in dotted line area A10 and in the dotted line area A11 can be a symmetrical structure with respect to the storage capacitor bus lines 38.

As shown in FIG. 5, the color filter substrate 50 comprises a black matrix pattern 52 substantially overlapping and corresponding to the scan lines 32, 32', the data lines 34, 34' and the storage capacitor bus lines 38 of the array substrate 30, and a plurality of bump patterns 54 disposed on a side opposite to the array substrate 30. Each bump pattern 54 comprises at least one main bump 54a corresponding to each pixel region 36 and at least one bump wing 54b corresponding to each data line 34, 34' or each scan line 32, 32'. The bump wing 54b is connected to at least one endpoint of the main bump 54a, and the main bump 54a and the bump wing 54b form an acute included angle α. The main bump 54a comprises a first protrusion 56a connected to a side 541 of the main bump 54a, and a distance d1 between the first protrusion 56a and an endpoint of the main bump 54a corresponding to thereof is about 8 to 15 micrometers, and 10 micrometers is preferred. The main bump 54a further comprises a second protrusion 56b connected to a side of the main bump 54a the same as the side the first protrusion 56a connected to, and a distance d2 between the second protrusion 56b and the first protrusion 56a is about 20 to 50 micrometers, and about 27 to 30 micrometers is preferred.

In addition, the main bump 54a further comprises a third protrusion 56c and a fourth protrusion 56d connected to the other side 542 of the main bump 54a opposite to the first protrusion 56a and the second protrusion 56b, and the third protrusion 56c is disposed corresponding to the first protrusion 56a. The fourth protrusion 56d is disposed corresponding to the second protrusion 56b. In this embodiment, the lengths of the first protrusion 56a, the second protrusion 56b, the third protrusion 56c and the fourth protrusion 56d are about 1.5 micrometers but not limited to this. The shape of their cross-section or top view of the protrusions can be rectangle, triangle, polygon or semicircle etc., and the first protrusion 56a, the second protrusion 56b, the third protrusion 56c and the fourth protrusion 56d can have same shape or different shapes.

As shown in FIG. 6, the bump pattern 54 of the color filter substrate 50 is disposed corresponding to the transparent electrode pattern 40 of the array substrate 30. Exactly, the main bump 54a of the bump pattern 54 and the slit of the transparent electrode pattern 40 are shown in parallel and alternating arrangement.

Figure 7:
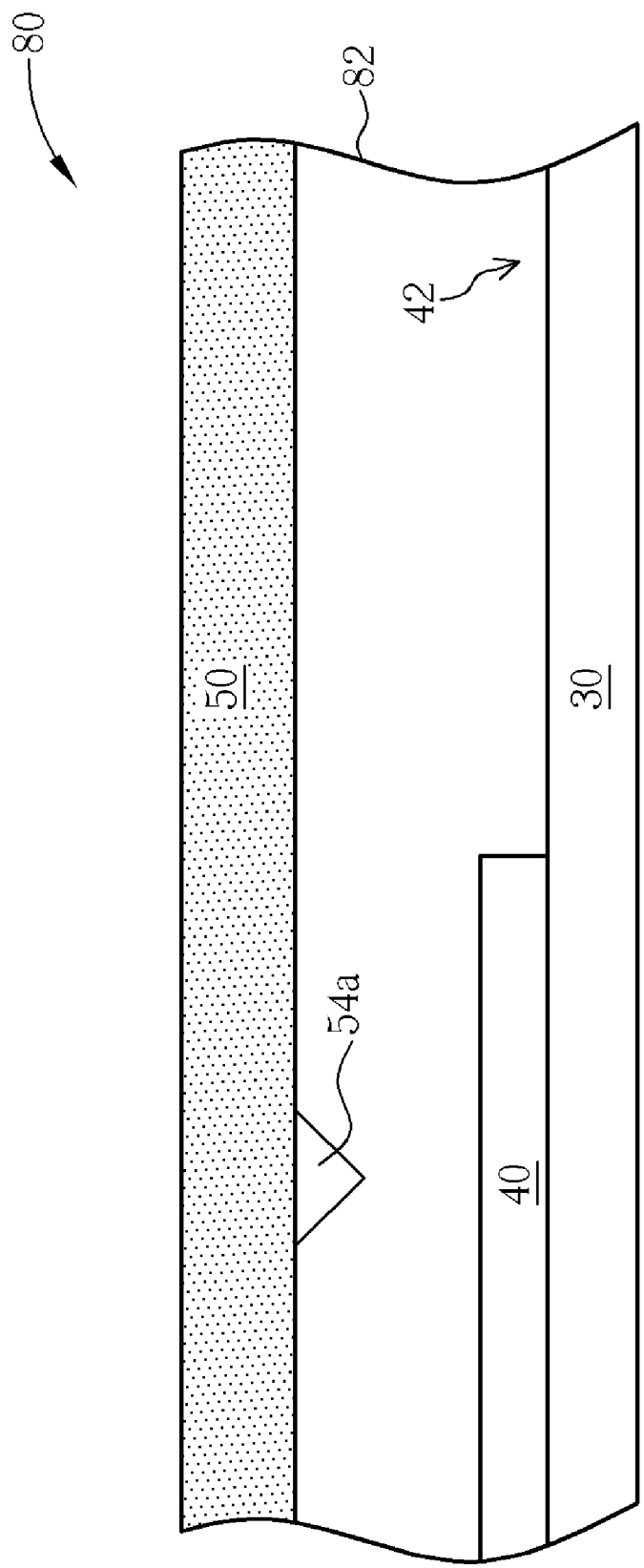
FIG. 7 is a cross-sectional view of the multi-domain vertical alignment liquid crystal display panel of the present invention, taken along a line AA' of FIG. 6.
Figure 8:
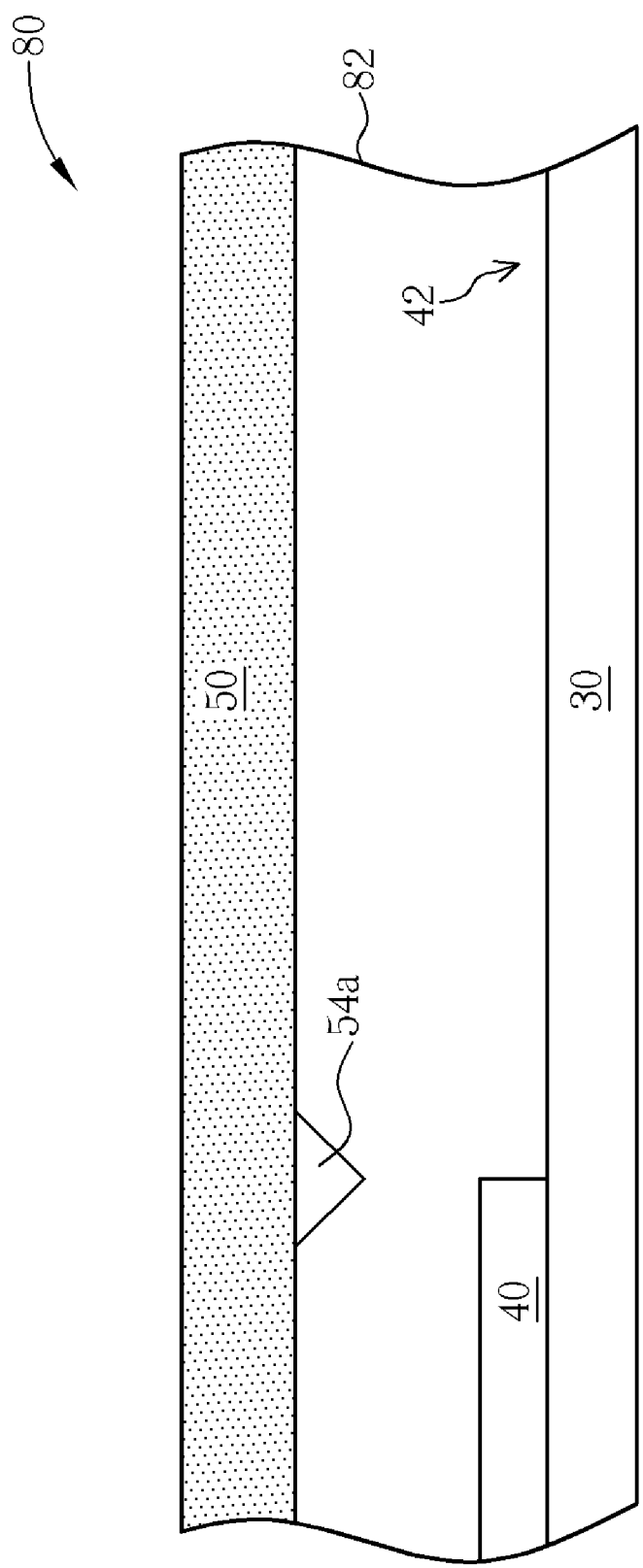
FIG. 8 is a cross-sectional view of the multi-domain vertical alignment liquid crystal display panel of the present invention, taken along a line BB' of FIG. 6.

Please refer to FIG. 7 and FIG. 8, and refer to FIG. 6 together. FIG. 7 is a cross-sectional view of the multi-domain vertical alignment liquid crystal display panel 80 of the present invention, taken along a line AA' of FIG. 6. FIG. 8 is a cross-sectional view of the multi-domain vertical alignment liquid crystal display panel 80 of the present invention, taken along a line BB' of FIG. 6. As shown in FIG. 7, in the area farther away from the data line 34', the main bump 54a is over the transparent electrode pattern 40. The main bump 54a and V-shaped slit 42 are arranged in alternation, so the liquid crystal layer 82 disposed between the array substrate 30 and the color filter substrate 50 is formed as a multi-domain alignment. As shown in FIG. 8, in the area near the data line 34', because of increasing lengths of the fine slits 44, the main bump 54a is aligned to the edge of the transparent electrode pattern 40 so as to perform the effect of improving the distribution of electric field.

In summary, the present invention has a design of the protrusion in a specific position of the bump pattern, and the design helps the liquid crystal molecules tilt to a presupposed position so as not to have a problem of bad arrangement of the liquid crystal molecules when a voltage is applied. In addition, the present invention adds a design of the fine slits having progressively increased lengths near the data line, and the design can effectively reduce the effect of transverse electric field in the edge of the transparent electrode pattern and effectively improve the arrangement of the liquid crystal molecules. Particularly, the bump pattern design and the fine slit design of the present invention can be applied individually depending on requirements or be applied together to the multi-domain vertical alignment liquid crystal display panel.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A multi-domain vertical alignment liquid crystal display panel comprising:
    an array substrate comprising a plurality of scan lines and a plurality of data lines, the scan lines and the data lines defining a plurality of pixel regions;
    a color filter substrate arranged parallel to the array substrate;
    a liquid crystal layer disposed between the array substrate and the color filter substrate; and
    a plurality of bump patterns disposed on the color filter substrate opposite to the array substrate, each of the bump patterns comprising a main bump corresponding to one of the pixel regions; at least one bump wing corresponding to at least one of the data line and the scan line and connected to at least one endpoint of the main bump; and a first protrusion, located completely within the one of the pixel regions, connected to a side of the main bump, wherein the first protrusions do not overlapping the data lines.

2. The multi-domain vertical alignment liquid crystal display panel of claim 1, wherein the first protrusion is disposed at about 8 to about 15 micrometers away from a corresponding endpoint of the main bump.

3. The multi-domain vertical alignment liquid crystal display panel of claim 2, wherein each bump pattern further comprises a second protrusion connected to the side as same as the first protrusion of the main bump, and the second protrusion is at about 20 to about 50 micrometers away from the corresponding first protrusion.

4. The multi-domain vertical alignment liquid crystal display panel of claim 3, wherein each bump pattern further comprises a third protrusion connected to another side of the main bump and disposed corresponding to the first protrusion.

5. The multi-domain vertical alignment liquid crystal display panel of claim 4, wherein each bump pattern further comprises a fourth protrusion connected to the another side and disposed corresponding to the second protrusion.

6. The multi-domain vertical alignment liquid crystal display panel of claim 1, wherein a length of each first protrusion is greater than about 1.5 micrometers.

7. The multi-domain vertical alignment liquid crystal display panel of claim 1, wherein each main bump and the bump wing form an acute included angle.

8. The multi-domain vertical alignment liquid crystal display panel of claim 1, further comprising a plurality of transparent electrode patterns disposed on the array substrate opposite to the color filter substrate and corresponding to each pixel region, each transparent electrode pattern comprising a main slit and a plurality of fine slits, the main slit having two endpoints, and the plurality of fine slits disposed at an outer side and an inner side of the main slit, wherein the fine slits disposed at the outer side of the main slit near the data line have different lengths.

9. The multi-domain vertical alignment liquid crystal display panel of claim 8, wherein the lengths of the fine slits disposed at the outer side of the main slit are increased progressively toward the data line.

10. The multi-domain vertical alignment liquid crystal display panel of claim 8, wherein the array substrate further comprises a plurality of storage capacitor bus lines parallel to the scan lines and penetrating through the pixel regions, and the two endpoints of the main slits are symmetric with respect to the storage capacitor bus lines.

11. The multi-domain vertical alignment liquid crystal display panel of claim 8, wherein the main slits are V-shaped.

12. The multi-domain vertical alignment liquid crystal display panel of claim 1, wherein the color filter substrate comprises a black matrix pattern substantially overlapping at least one of the data lines and the scan lines.

* * * * *